United States Patent [19]

Gyökhegyi et al.

[11] Patent Number: 5,080,837
[45] Date of Patent: Jan. 14, 1992

[54] PROCESS AND APPARATUS TO ESTABLISH CONTACT BETWEEN LIQUID AND VAPOUR OR GAS, PARTICULARLY IN DISTILLATION AND/OR ABSORPTION COLUMNS

[75] Inventors: László Gyökhegyi; Imre Boronyák, both of Budapest, Hungary

[73] Assignee: Innofinance Altalanos Innovacios Penzintezet, Hungary

[21] Appl. No.: 715,328

[22] Filed: Jun. 14, 1991

Related U.S. Application Data

[63] Continuation of Ser. No. 15,286, Feb. 17, 1987, abandoned.

Foreign Application Priority Data

Feb. 19, 1986 [HU] Hungary ............................. 689/86

[51] Int. Cl.$^5$ .............................................. B01F 3/04
[52] U.S. Cl. .............................. 261/114.1; 261/114.3
[58] Field of Search ........................ 261/114.1, 114.3

[56] References Cited

U.S. PATENT DOCUMENTS

| | | | |
|---|---|---|---|
| 3,282,576 | 11/1966 | Bruckert et al. | 261/114.3 |
| 3,550,916 | 12/1970 | Hoppe et al. | 261/114.3 |
| 4,301,098 | 11/1981 | Mix | 261/114.3 |
| 4,499,035 | 2/1985 | Kirkpatrick et al. | 261/114.3 |

FOREIGN PATENT DOCUMENTS

| | | | |
|---|---|---|---|
| 2015213 | 10/1971 | France | 261/114.3 |
| 510247 | 4/1976 | U.S.S.R. | 261/114.3 |
| 546356 | 2/1977 | U.S.S.R. | 261/114.3 |
| 989653 | 4/1965 | United Kingdom | 261/114.3 |

*Primary Examiner*—Tim Miles
*Attorney, Agent, or Firm*—Handal & Morofsky

[57] ABSTRACT

The invention relates to a process and apparatus to establish contact between liquid and vapour or gas on tray used in distillation and/or absorption columns. According to the process the liquid is accelerated upon arriving on the tray (1) perforated with holes (6) to such extent, that its velocity exceeds the velocity of the vapour or gas bubbles ascending from the liquid upon the buoyant effect. Then this accelerated flow rate is impacted with the downflow weir (9) and/or with the induction of vapour and/or gas jets having a component, oriented towards the interior of the tray (1), and a lubricant flow rate of greater layer thickness ($h_2$) slowed down below the earlier mentioned limit velocity is produced. No bubbles separate from the accelerated flow in the accelerating zone (1) of the tray, because they are entained by the liquid. On the other hand, the vapour or gas bubbles delivered and passing through the holes of the tray (1), leave the degasifying zone 11, where the flow is turbulent. Inclined axial (y) eyes with holes (3), or slot (60) on the tray above the one in question, and/or slipway (8) can be used for liquid acceleration.

17 Claims, 6 Drawing Sheets

PROCESS AND APPARATUS TO ESTABLISH CONTACT BETWEEN LIQUID AND VAPOUR OR GAS, PARTICULARLY IN DISTILLATION AND/OR ABSORPTION COLUMNS

This application is a continuation of application Ser. No. 015,286, filed Feb. 17, 1987, now abandoned.

FIELD AND BACKGROUND OF THE INVENTION

The invention relates to a process and apparatus to establish contact between liquid and vapour or gas, particularly on trays used in distillation and/or absorption columns.

As known, in order to establish close contact between the ascending vapour or gas and the downflowing liquid on the active surface of trays used in columns for carrying out distillation and absorption, generally the same elements (e.g. bells, valves, or holes) are used, the individual dimensions of which are identical on the whole active surface of tray. The "active surface" of the tray is the area of the tray reduced by the inlet and downflow areas. Some tray constructions are also known, wherein several types of the mentioned contacting elements are used simultaneously. Such is for example the sieve- or valve-type tray, which—beside the valve on the tray—is provided with separate holes.

This group includes the so-called "co-current" trays, on the active surface of which such elements are evenly distributed, or used at increasing rate in the main flow direction of the liquid, where the exit velocity or impulse of the vapour or gas flow has a horizontal component in the flow direction of the liquid. The flow direction of the vapour or gas immediately after exit from the contacting elements on these trays is the same as the main direction of the flow rate, hence the vapour or gas flow does not induce recirculation of the liquid, in contrast with the bell-, or valve-type trays. Such co-current tray is described in the DE-PS 1 632 219. The tray is provided with tongues compressed from the sheet metal of the tray. According to the DE-PS 3 417 975, the co-current slotted sieve tray is provided with orifices compressed also from the sheet metal, and arranged between the holes of the traditional sieve-tray. The special contacting elements of both trays protrude from the plane of the tray and thus they baffle the flow rate. The circular segment shaped areas are generally adjacent to the active surface of the trays serving for the inlet and outlet of the flow rate. Downflow weir can be arranged at the boundary of the active tray-surface and the down flow area of the liquid. The stagnant zones—dead spots—represent drawback for all the known tray constructions, where no contact exists between the two phases (liquid and vapour or gas). These dead spots cannot be eliminated for constructional reasons. All above described tray constructions have only a single function: namely bubbling of the ascending vapour or gas through the liquid layer conducted generally in cross-flow on the tray.

It is known however, that the compositions of the vapour or gas ascending from the trays of the distillation and/or absorption columns, as well as those of the liquid leaving the trays are not in thermodynamic balance, in other words the trays of known construction are unbalanced, i.e. their efficiency is lower than that of a theoretical tray. The reason for this—according to the generally accepted molecular diffusion theory—is that the balance between the liquid and vapour or gas would require infinitely long contact time and infinitely large contact surface. At the same time, the vapour or gas flow should perfectly be mixed with the liquid on the tray. The presently known trays are not suitable to satisfy these requirements and their efficiency, i.e. separating capacity is reduced by the stagnant zones (dead spots), thus it is automatically lower than the theoretically possible maximum capacity. Similar problems crop up in other cases of contacting gas and liquid, e.g. in the aeration of waste water, or other water to be treated.

Object of the present invention is to provide a process and apparatus for contacting vapour or gas and liquid, where the contact is more efficient than that of the earlier solutions, and results in a balanced or nearly balanced operation of the trays in columns used for carrying out distillation and/or absorption, and thus in maximal efficiency in contacting the phases.

It has been found that if the velocity of the flow rate conducted on to the tray is increased to a value exceeding the velocity of the vapour or gas bubbles ascending from the liquid upon the buoyant effect, while a turbulent liquid flow of lower velocity than this limit velocity is produced in the domain of the tray before the downflow area, then the balanced or nearly balanced operation of the tray, and thus the maximal efficiency of the contact between the liquid and vapour or gas can be accomplished. Namely in the first phase—accelerating zone—the liquid flowing at high velocity in thin (a few mm) layers, partly entrains the bubbles arising from the vapour or gas admitted from below, and partly the bubbles are comminuted by the arising unidirectional, high shear stress. No bubble ascent is experienced in this accelerating zone. In the second phase—degasifying zone—partly the vapour or gas bubbles entrained and conducted by the liquid are liberated, and leave the liquid mass, and partly the bubbles entering this zone from below will also move off.

In the whole area of the degasifying zone such intensive turbulence will develop, that complete mixing, free from dead spots will come about. Since the perfect mixing of the vapour or gas and liquid is conditional upon attaining the theoretical, balanced tray, thus the degasifying zone is equivalent to a theoretical, i.e. balanced tray.

SUMMARY OF THE INVENTION

According to the invention, in the course of which conducting the vapour and/or gas upwards, it is admitted into the liquid layer on the tray, and the essential feature of the process is to bring about in the domain of tray towards the liquid inlet a liquid movement, the velocity of which is approximating, or preferably exceeding that of the vapour or gas bubbles ascending from the liquid upon buoyant effect, while in the domain of the tray towards the downflow, a flow rate of lower velocity than that of the vapour or gas bubbles ascending from the liquid upon the buoyant effect and of layer thickness exceeding that of the liquid on the inlet side is produced. Thus the velocity of the liquid arriving on the tray is first increased over a limit value, then slowing down the accelerated flow rate—for example with downflow weir—below the mentioned limit value, a turbulent mass of liquid with considerably greater layer thickness is produced. Generally the liquid in the inlet domain of the tray is accelerated to at least 0.1 m/s, preferably to 0.3 m/s velocity; these are the velocity limit values of the ascending vapour or gas bubbles, depending first of all on the properties of the liquid (density, viscosity, surface stress). Generally the accelerated liquid is conducted in a maximum 1-10 mm thick layer. According to a preferred embodiment of the invention, the liquid flowing onto the tray is accelerated by vapour or gas jets admitted into the liquid from below, having horizontal component oriented from the inlet towards the downflow, and/or with the aid of inclined tray-sections sloping towards the downflow weir. According to another preferred embodiment, the liquid flowing on to the tray is accelerated with a slot above the plane of the tray, and/or with the aid of vapour and/or gas jets admitted into the liquid from below, having horizontal component oriented from the inlet towards the downflow. Furthermore it may be advisable to accelerate the liquid several times along several lines spaced from each other in the domain of the tray between the inlet, e.g. inlet weir, and the downflow with the aid of vapour or gas jet and/or sloping tray-sections. Slot can be used for repeated acceleration. According to a further preferred variant, the flow rate of greater layer thickness and lower velocity is produced with vapour and/or gas jets admitted into the liquid in the domain of the downflow, having suitably horizontal component oriented towards the interior of the tray.

The apparatus according to the invention is provided with a tray containing liquid and vapour or gas-contacting elements, e.g. passages, as well as with inlet and downflow on the opposite side, and is provided with liquid accelerating element(s) suitable for increasing the velocity of the liquid conducted on to the tray, in the inlet domain of the tray to a value at least approximating, preferably exceeding the velocity of the vapour or gas bubbles ascending from the liquid upon the buoyant effect. A preferred embodiment of the apparatus is characterized in that the liquid-accelerating elements are formed by such vapour or gas- admitting eyes arranged at least in one line in the inlet domain, for example along the inside of an inlet weir transversal, preferably perpendicular to the main flow direction of the liquid, the geometric longitudinal axis of which is oriented upwards at an angle, while in top view projection towards the downflow.

According to another embodiment the apparatus is provided with a liquid-accelerating element formed by a solid slipway, preferably sloping downwards directly from the upper edge of a downflow weir; it is advisable if the slop angle of the slip is 1-60°, preferably 5-45°.

A further embodiment is characterized in that the apparatus is provided with liquid-accelerating element(s) formed by a slot above the plane of the tray, in the domain of the inlet, ensuring the even distribution of the liquid as well. Generally the apparatus is provided with at least a further liquid-accelerating element formed suitably by a solid slipway, and/or with liquid-accelerating line of elements formed by vapour or gas admitting eyes, spaced from the accelerating element(s) in the domain of the inlet, or prefereably running parallel with those. The liquid-accelerating elements are situated mostly below, or extending maximum up to the upper plane of the tray.

The slot provided as liquid-accelerating element for the given tray in the column may be between the lower flange of the downflow-sheet of a second tray above the former one and the plane of the tray, or in the downflow-sheet, suitably directly a bove the plane of the tray.

Yet a further embodiment is characterized in that it is provided with a downflow weir as a baffle element extending over the plane of the tray in the domain of the downflow, for the induction of vapour and/or gas jets, having suitably horizontal component opposite to the main flow direction of the liquid. The latter ones are generally formed by eyes and/or openings and/or holes, the axis of which is oriented upwards at an angle towards the interior of the tray, built into the tray along the downflow edge at the junction of the tray and the downflow sheet; and it is advisable to arrange the baffle elements in one or several lines parallel with the downflow edge. Generally these baffle elements are situated below, or extending maximum up to the upper plane of the tray.

BRIEF DESCRIPTION OF THE DRAWINGS

Further details of the invention will be described more particulary by way of example with the aid of drawings showing the preferred embodiments of the tray and the process, as follows.

DESCRIPTION OF THE PREFERED EMBODIMENTS

Figure 1:
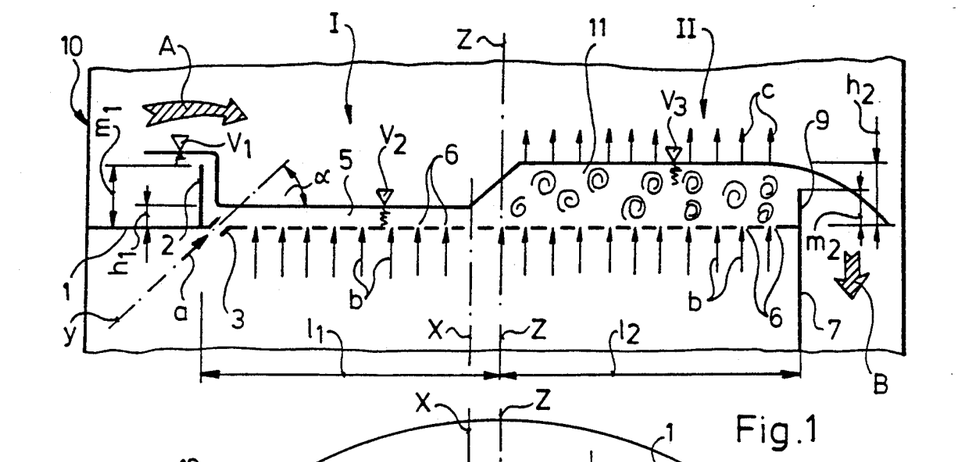
FIG. 1 is a vertical sectional view along line 1—1 marked in FIG. 2, showing the embodiment of the tray according to the invention.
Figure 2:
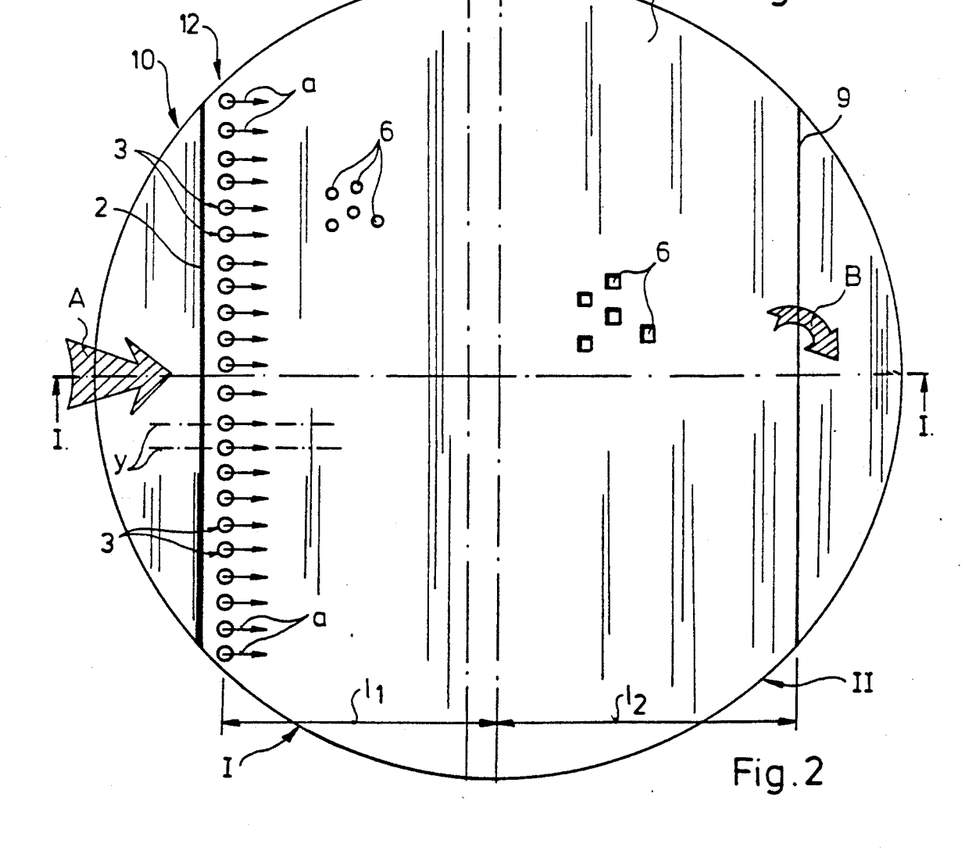
FIG. 2 is the top view of the tray shown in FIG.1.

The circular tray 1 shown in FIGS. 1 and 2 is built in conventional way into a vertical and cylindrical column 10. On the inlet side (arrow A) of the liquid to be contacted with vapour or gas, an inlet weir of height $m_1$ is arranged running parallel with the vertical geometric medium plane x perpendicular to the main flow direction of the liquid, that is identical with the inlet direction A, and perpendicular to the plane of tray 1. A similarly vertical downflow weir 9 is on the opposite side running parallel with the inlet weir 2. Its height $m_2$ is the present case lower than the height $m_1$ of the inlet weir 2. The active surface of the tray 1 is arranged between weirs 2 and 9. Weir 9 is formed by the upper strip of vertical wall 7 in the interior of column 10.

Liquid-accelerating elements 3 are built into the tray, provided with inclined axial y vapour or gas-induction holes in one or several lines 12 running parallel with the inlet weir 2, inside the inlet weir 2, i.e. in the active domain of the tray 1. The axis y is oriented towards the active domain, and it is at an angle x to the upper plane of tray 1, being suitably an acute angle. In top view projection the axes y are perpendicular to the weir 2. Accordingly, the vapour or gas flows through the liquid-accelerating elements 3 into the liquid layer 5 on tray 1 upwards at an angle according to arrows a, and forward in respect of the flow direction A of the liquid.

The liquid-accelerating elements 3 may be formed for example by inclined axial eyes described in the HU-PS 182 652, but other elements can also be used, e.g. elements machined with incision and lateral bending from the plane of the sheet metal, which conduct the gas jets upwards at an angle, or horizontally into the liquid.

In the active domain of the tray 1, i.e. between the inlet weir 2 and downflow weir 9, where the tray is horizontal, gas or vapour induction elements 6 are arranged everywhere, formed by vertical axial holes in the present case. The cross sectional shape of these holes may be optional, e.g. circular, quadrangular, etc. Spacing of the holes is also optional.

For the sake of better overall view, only a few holes of circular or square cross section are shown in FIG. 2. The flow direction of the gas or vapour phase passing upwards, through the holes into the liquid on the tray, is visualized by arrows b in FIG. 1. It is noted that the axis of these holes may point upwards at an angle in the flow direction of the liquid.

The contact between the liquid and gas or vapour on the tray 1 shown in FIGS. 1 and 2 takes place as follows:

The liquid arriving with level $v_1$ from the direction of arrow A, flowing over the inlet weir 2 passes to the active surface of the tray 1, where it flows in layer thickness $h_1$ with liquid level $v_2$ lower than $v_1$ towards the downflow weir 9. The flow velocity of the liquid is increased with the gas or vapour flowing through the liquid-accelerating element(s) 3—by transmitting the impulse of the ascending gas or vapour flow—to such extent as to exceed the velocity of the vapour or gas bubbles ascending from the liquid upon the buoyant effect, which—depending on the physical properties (density, viscosity, surface stress) of the admitted liquid—is generally 0.1-0.3 m/s. The thickness $h_1$ of the liquid layer 5 is only a few mm. The flow rate accelerated over the limit velocity in this thin layer entrains the gas or vapour bubbles entering through the gas or vapour inlet holes in the direction of arrows b, and meanwhile the bubbles are comminuted by the arising co-current high, shear stress.

The liquid layer 5 accelerated over the limit velocity extends only to the side of the tray 1 closest to the liquid-inlet, and it occupies only a certain proportion of the active tray-surface, depending on the velocity, physical characteristics of the liquid, resistances reducing the liquid-velocity /viscosity, roughness of the tray and column-wall, as well as on the construction of the tray and column (e.g. contact elements protruding occasionally from the plane of the tray, etc). This domain of the active surface, which runs between the intermediate domain of the inlet weir 2 and the tray 1, i.e. the vertical plane z parallel with weirs 2 and 9 and lying slightly towards the downflow weir 9, and its theoretical length is marked with reference letter $I_1$ in FIGS. 1 and 2, is called—according to its function—the acceleration zone I of the tray 1. The velocity vectors in the accelerating zone I are parallel with each other, and point in the direction of the downflow weir 9.

The high velocity liquid is impact—actually perpendicularly—by the downflow weir 9 and a turbulent liquid flow is produced by a certain part of its impulse in the zone of length $I_2$ before the downflow weir 9. The flow of height $h_2$ and of level $y_3$ exceeds the level $y_2$, and its velocity is lower than the limit velocity of the ascending bubbles, where the velocity vectors of the liquid are no longer parallel with each other. The thickness (depth) $h_2$ of this liquid layer 11 exceeds the height $m_2$ of the downflow weir 9. This zone of length $I_2$ runs between the vertical plane z and the downflow weir 9, and—in view of its function—it can be defined as the degasifying zone II of the tray. Namely slowing down the liquid below the limit value in the degasifying zone II results in liberation partly of the vapour or gas bubbles entrained from and conducted to the accelerating zone, and partly the bubbles arising from the vapour or gas flow conducted upwards through holes 6 (arrow b) in section $I_1$ into the turbulent liquid layer 11. In this degasifying zone the turbulent liquid movement brings about mostly shear stresses, comminuting the emerging bubbles. The comminuted tiny bubbles are liberated and ascend in uniform densitiy on the whole area of the degasifying zone II, i.e. between the contacting elements, e.g. holes and in the stagnant zones (dead spots) too, developing on the edges of the circular cross sectional tray, whereby the turbulence of the liquid layer 11 is further increased. Since the turbulence of the liquid is high in the degasifying zone, complete mixing takes place without stagnant zones (dead spots). Since the perfect mixing of the phases means the theoretically-balanced tray, the degasifying zone II represents a theoretical trayequivalence. The vapour or gas bubbles leave the liquid layer 11 in the direction of arrows c (FIG. 1), while the liquid flowing over the downflow weir 9 leaves the tray 1 in the direction of arrow B.

In view of the foregoing, a double function—resulting in balanced operation—is realized on the active surface of the tray according to the invention: partly the velocity of the flow rate conducted on the tray is increased, and partly the velocity of the accelerated liquid is slowed down by the downflow weir, whereby complete mixing of the vapour or gas phase and the liquid phase is accomplished. It is noted, that the transition between the accelerating zone I and degasifying zone II is fairly short, however the plane z represents only a theoretical boundary between the two zones, and the criteria are characteristic on both sides to the two zones, if only to a minimal extent and distance.

The total pressure drop on the double functioning, balanced tray 1 according to the invention is lower than on other trays under the same conditions. The reason for this is found in the double function according to the invention. Namely in the accelerating zone I the surface of tray 1 is covered only with a thin liquid layer 5, hence the pressure drop taking place in the vapour or gas flow is greater only by the hydrostatic pressure of the a few mm thick liquid layer 5, than the so-called "dry" pressure drop of the tray 1. Accordingly the total amount of the vapour or gas flow conducted on to the tray 1 is liberated in the form of evenly distributed tiny bubbles in the degasifying zone II. Here the liquid is aerated to a great extent. Thus its density is only 40% of that of the liquid conducted on to the tray 1. Consequently in the degasifying zone II the total pressure drop taking place in the vapour or gas flow, is influenced—besides the so-called dry pressure drop of tray 1,—by the hydrostatic pressure of the considerably aerated liquid layer.

In view of the foregoing, the total pressure drop occurring jointly in the accelerating zone I and degasifying zone II is lower than the pressure drop of the presently known and used trays fulfilling only one function, and in which the liquid or the tray is aerated to a lesser extent.

It is an important and favourable property of the tray according to the invention, that the double function, taking place by acceleration of the liquid's velocity and by impacting the high velocity liquid by the downflow weir 9, lasts in the whole functional domain of the tray 1 (e.g. from cessation of flowing through the holes until atomization of the liquid on the tray). This also means, that the balanced functioning of the tray 1 is independent from changing the velocity of the vapour or gas within the functional domain.

Figure 3:
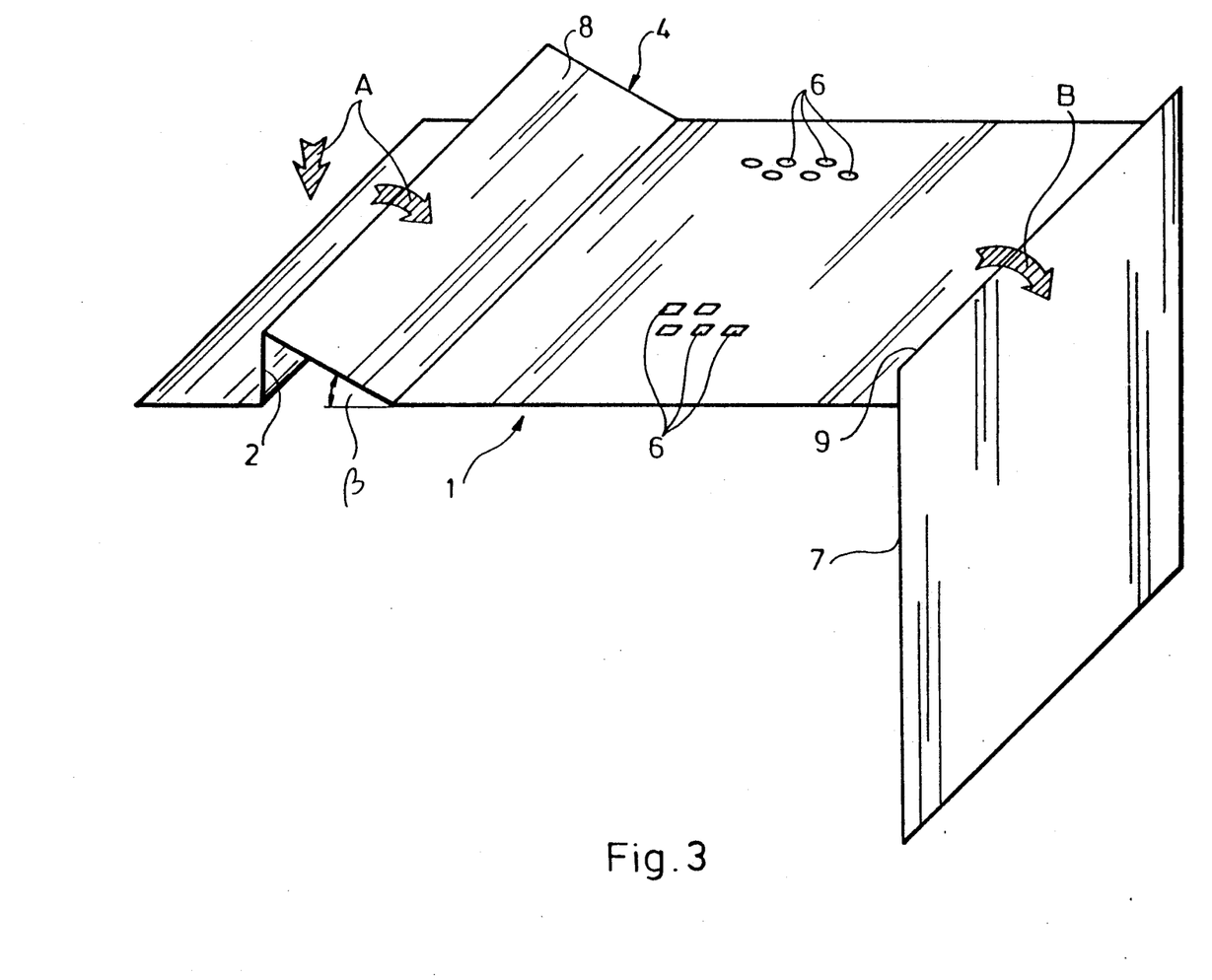
FIG. 3 is the perspective view of another embodiment of the tray according to the invention.

A tray according to the invention is shown in FIG. 3. It is built into a column of rectangular cross section (not illustrated), which is different from the tray shown in FIGS. 1 and 2. The construction of the liquid-accelerating element is also different as the liquid-accelerating element 4 in this case is formed by a slipway 8 made of sheetmetal, starting from the upper edge of the inlet weir 2 and bending down at an angle in the direction of arrow A. This is preferably an acute angle: generally 1–60°, preferably between 5 and 45°, depending on the flow rate. The liquid arriving on the tray 1 from the direction of arrow A, and flowing through the inlet weir 2 is accelerated on the slipway 8—flowing in the direction of the slope—, and during its flow reaches at the bottom of the slop that limit velocity, which exceeds the velocity of the ascending vapour or gas bubbles upon the buoyant effect. Then the flow conditions and processes described in connection with FIGS. 1 and 2 take place on the tray 1, and its construction is also the same, hence the structural parts described in connection with FIGS. 1 and 2 are marked with the same reference numbers.

As mentioned before, the length of the accelerating zone I in FIGS. 1 and 2, is determined in case of the given construction by the accelerated velocity of the flow rate, and the resistances reducing the velocity of the liquid (viscosity, roughness of the tray and column mantle, contact elements occasionally protruding from the plane of the tray). These resistances, as well as the comminution of the bubbles arising from the vapour or gas flow admitted into the accelerating zone, and the transmitted impulse jointly result in reducing the already once accelerated velocity of the liquid to the limit- or lower velocity. In order to prevent this, it is advisable to increase the liquid velocity on the active surface of the tray at least once from time to time. This way the accelerating zone can be formed even on large diameter trays, moreover its length can be increased from time to time.

Figure 4:
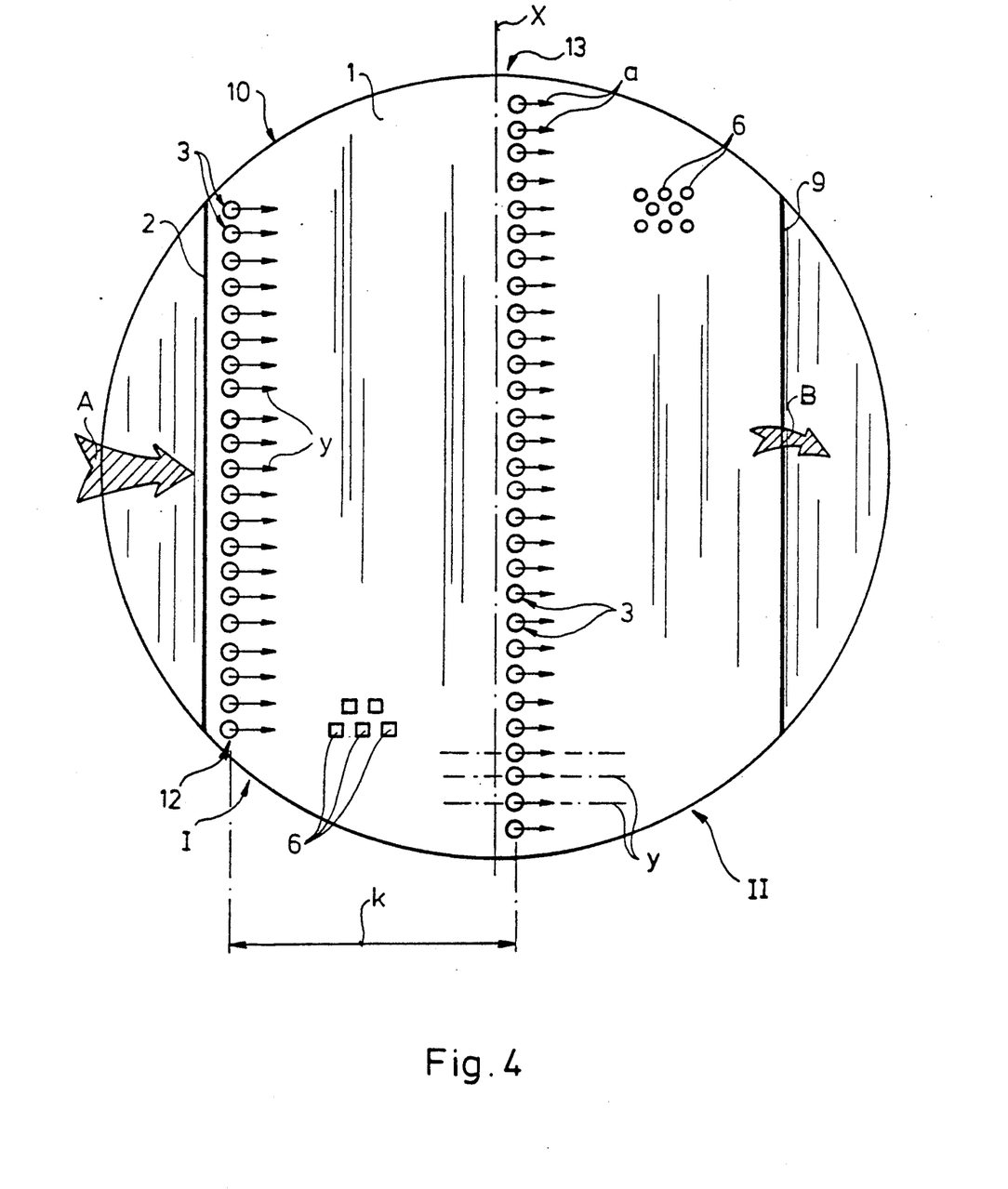
FIG. 4 is the top view of a further embodiment of the tray.

Acceleration of the liquid velocity in an intermediate spot on tray 1 as shown in FIG. 1, can be accomplished with the method shown in FIG. 4, that is, by building in a second liquid-accelerating line of elements 13, running parallel with and at a distance k from the first liquid-accelerating line of elements 12. The liquid-accelerating elements 3 in line 13 are identical with those in line 12, but the other structural elements of the tray are marked with the reference numbers used in FIG. 1 and 2. The liquid-accelerating elements 3 in line 12 accelerate the liquid to the required velocity, the flow rate slowed down below the limit velocity in the wake of the friction arising on the contact surfaces and in the liquid, as well as upon impact with the ascending gas or vapour throught the gas or vapour admitting elements 6 (holes), is accelerated again to the velocity exceeding the limit velocity, by the liquid-accelerating elements 3/eyes) of the liquid-accelerating line of elements 13 having axes y pointing upwards at an angle. The flow rate in this case too, is impacted by the downflow weir 9 made of sheet metal, followed by formation of the accelerating zone 1 and degasifying zone 11, then the liquid leaves the tray 1 in the direction of arrow B. Evidently the distance k between the liquid-accelerating lines of elements 12 and 13 has to be selected with regard to the reduced velocity of the flow rate caused by the resistances, without reducing the velocity in the domain between the lines 12 and 13 below their earlier defined limit value. (The distance k may be the same or nearly the same as the spacing $l_1$ shown in FIG. 1 and 2). It also stands to reason, that-besides the given flow rate and tray dimensions-several, number "n" liquid-accelerating lines of elements can also be built into the tray.

Figure 5:
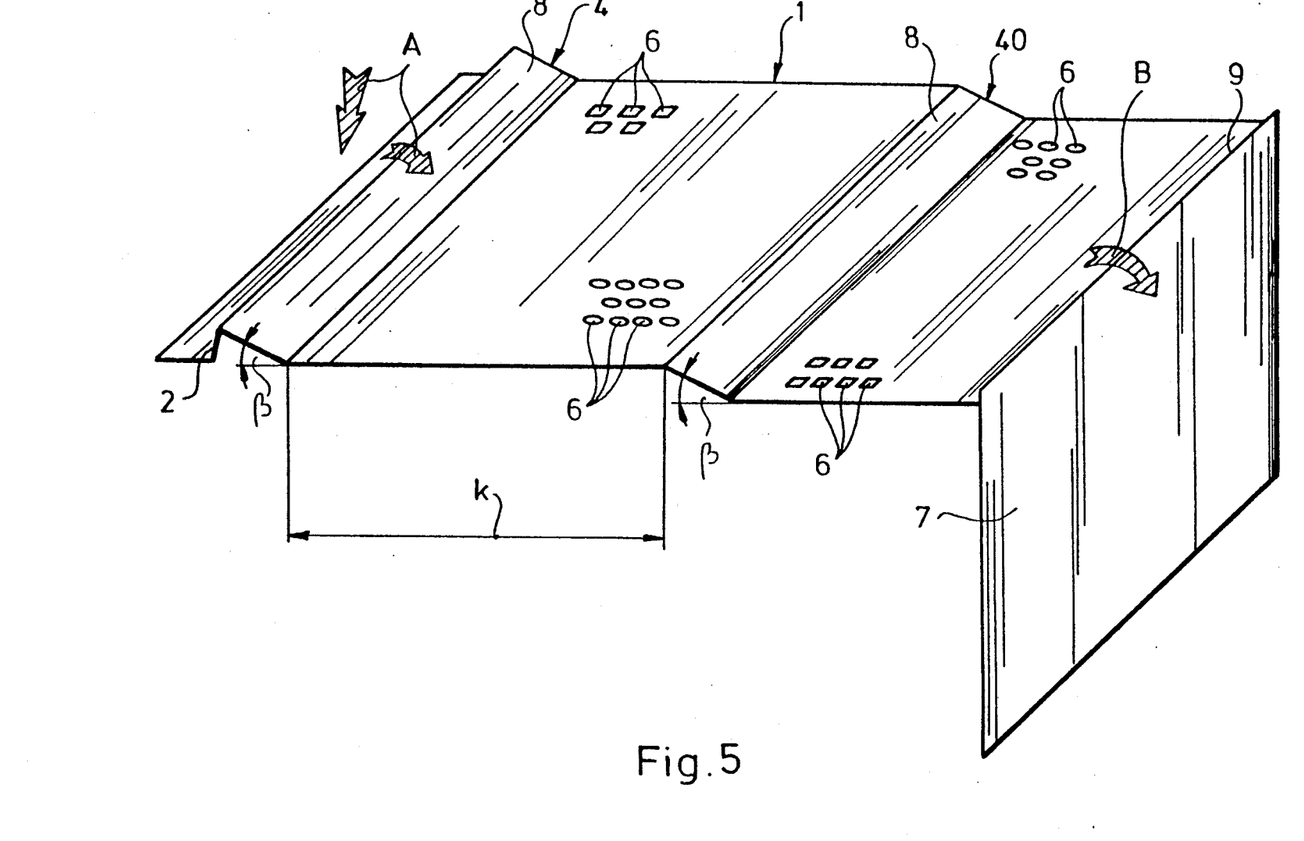
FIG. 5 is the perspective view of another embodiment of the tray.

The tray in FIG. 5 is different from the one shown in FIG. 3, in that the tray is provided with a second liquid-accelerating element 40 made similarly of solid sheet metal in the form of slipway arranged at a distance k from the first liquid-accelerating element 4 connected to the inlet weir 2, the purpose of which is the intermediate acceleration of the flow rate over the limit velocity, which was slowed down in the wake of the friction and other resistances. The distance k has to be selected in this case too with regard to the extent of the resistances. It is also evident, that several intermediate slipways 8 can be built in, if necessary. Finally it is evident, that the liquid-accelerating lines of elements 12, 13 shown in FIG. 4, and the liquid-accelerating elements 4 and 40 shown in FIG. 5 can be used in combination with each other within the same tray.

Any means for the repeated intermediate acceleration of the slowed downflow rate is to be arranged on the tray as to have such horizontal part of the tray available perforated with vapour or gas inlet holes, the width of which before the downflow weir 9 approximately equals the distance k shown in FIG. 4.

Otherwise the length of the accelerating and degasifying zones on the tray according to the invention is variable. If the height $m_2$ of the downflow weirs 9 of trays 1 in FIG. 1 and 2 is constant, the length $l_1$ of the accelerating zone 1 increases according to the velocity of the liquid, while the length $l_2$ of the degasifying zone 11 decreases. At the same time the thickness $h_1$ of the liquid layer 5 in the accelerating zone will be less, and the depth $h_2$ of the liquid layer 11 in the degasifying zone will increase. If the liquid velocity is constant, the length $l_2$ of the degasifying zone 11 can be increased with the height $m_2$ of the downflow weir 9, while the thickness $h_1$ and $h_2$ of the liquid layers 5, 11 remain the same in both zones 1, 11.

The height of the downflow weir 9 required in the present case to bring about the degasifying zone and process, is generally 5–80 mm, preferably between 15 and 40 mm, depending on the exit of the gas or vapour flow leaving the elements used for acceleration of the liqued, and on the angle ($\beta$) of the slipway used similarly for acceleration of the liquid.

Figure 6:
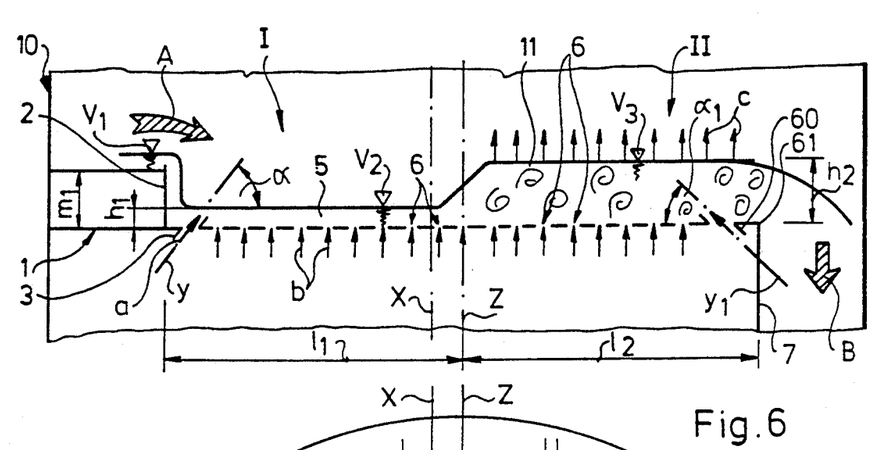
FIG. 6 is a vertical sectional view along line VI—VI marked in FIG. 7, showing a further embodiment of the tray similar to the one in FIG. 1.
Figure 7:
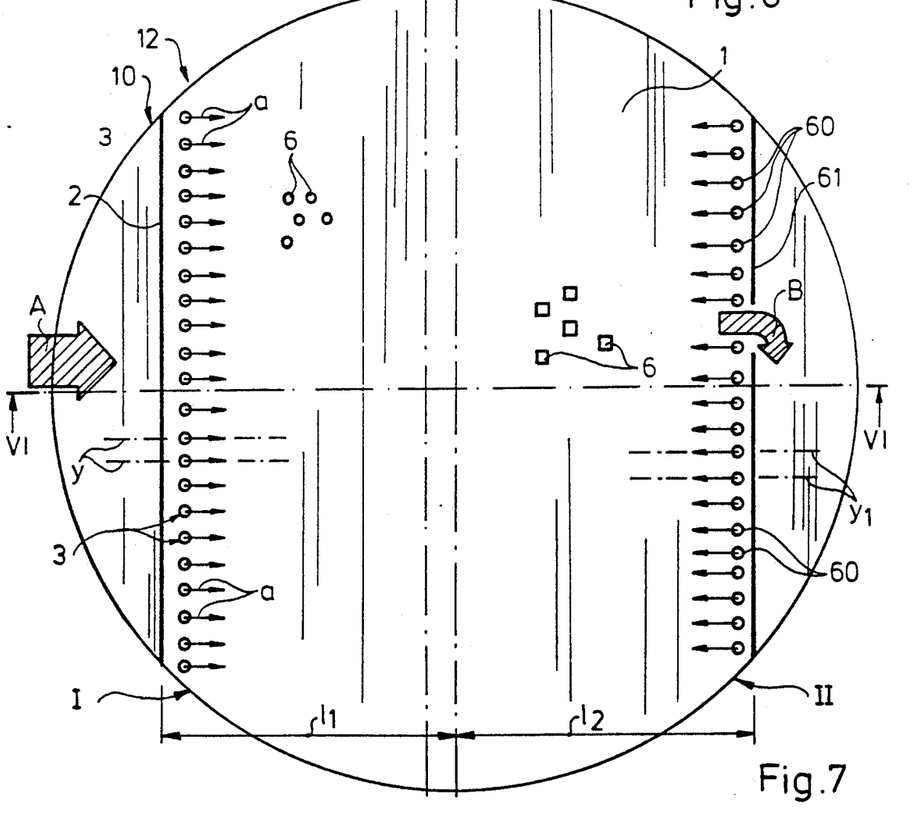
FIG. 7 is the top view of the tray shown in FIG. 6

The tray in FIG. 6 and 7 differs from the one shown in FIG. 1 and 2, in that it has no downflow weir, but vapour or gas flow with component opposite to the main flow direction of the liquid is conducted into the liquid in the domain along the downflow edge 61 in order to reduce the velocity of the liquid and to obtain the turbulent liquid layer 11 of increased height $h_2$. The direction of the vapour or gas flow is marked with dash-dot line and arrow $y_1$; the value of the angle $a_1$ to the horizontal may be identical with the angle $a$ of the vapour and/or gas jets y injected through the liquid-accelerating elements 3, but the direction $y_1$ is naturally opposite to the direction y. The baffle element 60 used for injection of the $y_1$-oriented vapour and/or gas jets are formed by inclined axiale eyes described for example in the Hungarian Patent Specification No. 186 652, but other baffle elements machined with incision and lateral bending from the plane of the sheet metal can also be used, which conduct the gas and/or vapour jets upwards at an angle, or horizontally into the liquid. In case of suitable thick tray, inclined axial holes would be sufficient for the injection of the decelerating $y_1$-oriented gas jets.

Otherwise the contact between the liquid and gas or vapour phase on the tray shown in FIG. 6 and 7 is the same as described in connection with FIG. 1 and 2, and the processes taking place there are the same in this case as well.

Figure 8:
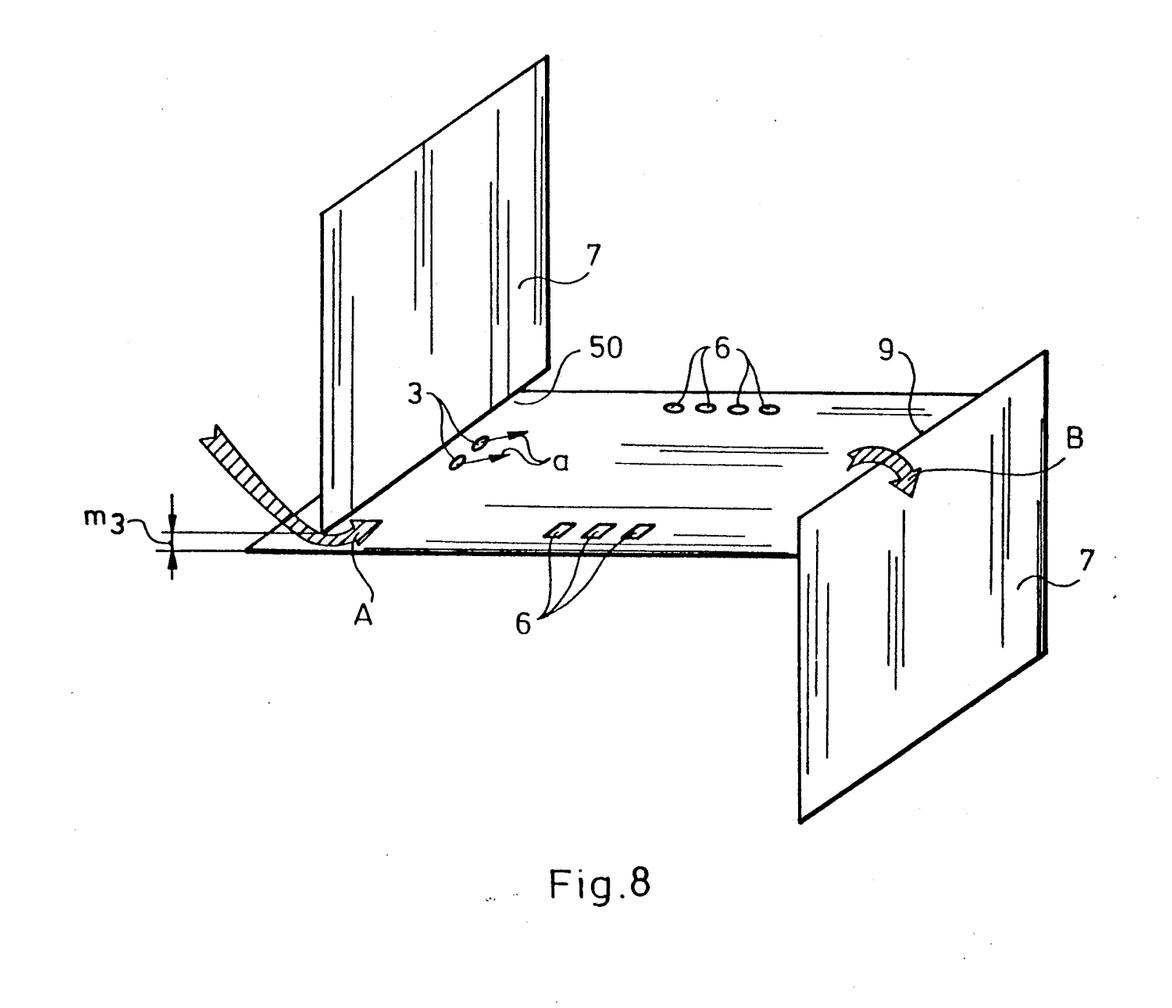
FIG. 8 is the perspective view of a further embodiment of the tray.

The embodiment in FIG. 8 differs from the one shown in FIG. 1 and 2 in that the liquid arrives on tray 1 without flowing over the weir, but through slot 50 in the interior of the column below the wall 7, evenly distributed according to arrows A. Namely in this case the lower edge of wall 7 runs above the plane of tray 1 at a distance $m_3$. The length of slot 50 in the present case is the same as the length of the wall 7 and its height is $m_3$, and this way the velocity of the liquid flowing through can be influenced with the area of the slot. If the cross section of the slot is selected so that the velocity of the liquid conducted on to the tray 1 exceeds a certain low limit value, e.g. 0.3 m/s, the earlier described liquid-accelerating elements 3 are not absolutely necessary (showing only two in FIG. 8 for the sake of better overall view); however the gas or vapour admitting elements 6 (holes) are necessary under any circumstances. Thus in this case the liquid-accelerating element may be formed only by the slot 50 if however the slot by itself is not capable to ensure the mentioned lower velocity limit value, e.g. 0.3 m/s, then the slot has to be combined with liquid-accelerating elements, e.g. inclined axial eyes. The sheet metal 7 below the slot 50 is formed by the downflow sheet of the tray situated above the tray 1 in the column according to FIG. 8, but it is conceivable that the downflow sheet 7 above the plane of the tray 1 has a suitably horizontal slot for accelerating of the liquid. In any case, the same flow conditions and processes take place on the tray 1, as described in connection with FIG. 1 and 2, and the identical structural elements are marked with the already used reference numbers.

It is noted, that in case of the examples in FIG. 3 and 4 the slipway used as liquid-accelerating element can be combined with these liquid-accelerating elements 3, e.g. inclined axial eyes.

The advantages of the invention are the following:

From technological point of view, the high efficiency of the trays according to the invention is an evident advantage. The reason for this is the perfect mixing of the liquid with the vapour or gas conducted on to the tray, taking place in the degasifying zone without stagnant zones (dead spots). The theoretically attainable 100% efficiency is spoiled only by the secondary influence of the liquid drops entrained with the vapour or gas flow to a slight extent so that the efficiency of the tray according to the invention is practically higher than 90%, independently from the physical properties of the mixture to be seperated.

Further advantage is, that the accelerating and degasifying function of the tray according to the invention prevails in the stable operational domain of the tray, assuming the constant ratio of the vapour or gas flow and the flow rate. Thus the extremely high efficiency remains constant in the whole operational domain of the tray. Besides this the efficiency is essentially independent from the physical properties of the mixture to be separated.

The vapour or gas flow ascending in the column from one tray to the another one above it, suffers directional change while passing through the elements serving for acceleration of the flow rate, whereby a considerable part of the liquid drops entrained by the vapour or gas flow cannot reach the tray. This results in the advantage, that in case of the trays according to the invention about 350 mm distance between the trays is sufficient against the entrainment, contrary to the traditionally used 450-600 mm distance between the trays.

Similarly favourable property of the tray according to the invention is, that in contrast with the trays of traditional construction and function the pressure drop is lower under comparable conditions. This is advantageous mainly in case of vacuum distillation, and columns built with large number of trays or series-connected with each other. Namely in the case of vacuum distillation exceeding the permissible maximum value of the total pressure prevailing at the bottom of the column, results first of all in the thermic damage of the bottom product. Besides this, the small pressure drop in each tray will allow in every case the use of heating medium of low energy-level.

Further advantage is that the change in the pressure drop occurring on the trays according to the invention under identical conditions, is less dependent on the change in the vapour or gas velocity, than in case of the known tray constructions fulfilling only one function.

From operational point of view it is an advantage that the main sources of troubles: moving parts exposed to wear are not applied on the tray.

The column consisting of trays according to the invention, projected to technological advantages and contact efficiency, is considerably more favourable in respect of the cost of investment and operation, than the presently known columns.

Naturally the invention is not restricted to the examples described in the present disclosure, but it can be realized in many other ways within the scope claimed therebelow.

We claim:

1. A process for establishing contact between a liquid and vapor for use on a tray of distillation and/or absorption columns containing vapor or gas transmitting holes, wherein the vapor is conducted upwards into the liquid layer on the tray, comprising the steps of creating, in a region of the tray towards the liquid inlet, a liquid movement which approximates, and exceeds the velocity of the vapor or gas bubbles ascending from the liquid upon the buoyant effect, while in the region of the tray towards the downflow, creating a second flow rate and a second layer thickness greater than the layer thickness of the liquid in the region of the inlet, and the velocity of said second flow rate is lower than the velocity of the vapor or gas bubbles ascending from the liquid upon the buoyant effect.

2. The process as claimed in claim 1, comprising the accelerating of the liquid to at least 0.1 m/s in the region of the tray towards the inlet.

3. The process as claimed in claim 1, comprising the production of the accelerated liquid in a maximum 1 to 10 mm thick layer.

4. The process as claimed in claim 1, comprising the creating of the second flow rate of a thicker layer and lower velocity on the tray on the section before the downflow area, with the aid of the downflow weir formed on the downflow area of the tray.

5. The process as claimed in claim 1, comprising the accelerating of the liquid flowing onto the tray with the aid of a slot above the plane of tray, and with vapor jets conducted into the liquid from below, having a horizontal component, oriented from the inlet towards the downflow.

6. The process as claimed in claim 1, comprising the creating of the second flow rate of a thicker layer having a lower velocity with vapor gas jets injected into the liquid in the region of the downflow, oriented toward the interior of the tray, and having suitably a horizontal component.

7. The process as claimed in claim 1, comprising the accelerating of said liquid to at least 0.3 m/s in the inlet region of the tray.

8. The process as claimed in claim 1, comprising the accelerating of the liquid flowing onto the tray with the aid of vapor jets conducted into the liquid from below, having a horizontal component, oriented from the inlet towards the downflow.

9. The process as claimed in claim 8, comprising the accelerating of the liquid several times with vapor jets and with sloping tray section(s) along several lines spaced from each other in the region of the tray between the inlet and the downflow.

10. The process as claimed in claim 8, comprising the accelerating of the liquid several times with vapor sloping tray-sections and with slots (50) along several lines spaced from each other in the region of the tray between the inlet and downflow.

11. An apparatus to achieve enhanced liquid and vapor contact and mixing, for use in distillation and absorption columns, said apparatus being a tray comprising:
   a) a liquid inlet and an associated inlet region;
   b) a liquid exit and an associated exit region;
   c) vapor passage means defined in said tray in both the liquid inlet region and the liquid exit region and any area therebetween;
   d) liquid accelerating means in said inlet region positioned, dimensioned and configured to increase the velocity of the liquid moving from said inlet to a value greater than the velocity of the vapor bubbles buoyantly rising through said liquid, thus preventing gasification; and
   e) liquid decelerating means in said exit region positioned, dimensioned and configured to decrease the velocity of the liquid moving towards said exit below said velocity of vapor bubbles rising through said liquid thus bringing about gasification resulting in enhanced vapor-liquid mixing.

12. An apparatus to contact liquid with vapor for distillation and/or absorption columns, provided with at least one tray containing liquid and vapor contacting elements with a liquid inlet on one side of said tray and a downflow arranged on the opposite side of said tray, said tray comprising:
   a) liquid-accelerating elements positioned, dimensioned and configured to increase the velocity of the liquid conducted onto said tray in the region of the inlet to a value approximating, and exceeding, the velocity of the vapor bubbles ascending from the liquid upon the buoyant effect; and
   b) baffle elements increasing the height of the liquid layer and reducing the velocity of the liquid in the region of the downflow, wherein said liquid-accelerating elements are formed by vapor admitting eyes arranged in the region of the inlet at least in one line running along the inside of an inlet weir transverse to the main flow direction of the liquid, the geometric longitudinal axis of the hole defined by said eyes being oriented upwards at an angle, while in top view, projecting towards the downflow, wherein the liquid-accelerating elements are situated below, or extending up to the upper plane of the tray.

13. The apparatus as claimed in claim 12, wherein a slot is provided as a liquid-accelerating element for said tray in the column, between the lower edge of a downflow sheet of a second tray situated above said tray and the plane of said tray.

14. The apparatus as claimed in claim 12, wherein said apparatus is provided with deceleration elements as said baffle element, said deceleration elements positioned in the vicinity of the downflow for the induction of vapor jets into the liquid, having suitably horizontal component, the direction of which is opposite to the main flow direction of the liquid.

15. The apparatus as claimed in claim 14 wherein said baffle elements are arranged above, or extending, at maximum, up to the upper plane of the tray.

16. The apparatus as claimed in claim 14, wherein the vapor inducting baffle elements are formed by inclined axial eyes and/or openings and/or holes oriented upwards at an angle towards the interior of the tray, built into the tray along the downflow edge at the junction of the tray and the downflow sheet metal.

17. The apparatus as claimed in claim 16, wherein said baffle elements are arranged in one or several lines parallel with the downflow edge.

* * * * *